(12) United States Patent
Wellen

(10) Patent No.: US 10,192,335 B1
(45) Date of Patent: Jan. 29, 2019

(54) REMOTE CONTROL HIGHLIGHTER

(71) Applicant: Alexander Wellen, Atlanta, GA (US)

(72) Inventor: Alexander Wellen, Redondo Beach, CA (US)

(*) Notice: Subject to any disclaimer, the term of this patent is extended or adjusted under 35 U.S.C. 154(b) by 0 days.

(21) Appl. No.: 14/832,257

(22) Filed: Aug. 21, 2015

Related U.S. Application Data

(60) Provisional application No. 62/041,221, filed on Aug. 25, 2014.

(51) Int. Cl.
*G09G 5/00* (2006.01)
*G06T 11/60* (2006.01)
*G06F 3/14* (2006.01)
*H04N 5/232* (2006.01)

(52) U.S. Cl.
CPC .............. *G06T 11/60* (2013.01); *G06F 3/14* (2013.01); *H04N 5/23229* (2013.01)

(58) Field of Classification Search
CPC ...... G06F 3/0346; G06F 3/0304; G06F 3/033; G06F 3/0338
USPC .................................. 345/156–172; 348/734
See application file for complete search history.

(56) References Cited

U.S. PATENT DOCUMENTS

| | | | |
|---|---|---|---|
| 6,275,214 B1 | 8/2001 | Hansen | |
| 7,091,949 B2 * | 8/2006 | Hansen | G06F 3/0386 345/157 |
| 8,436,836 B2 | 5/2013 | Njølstad et al. | |
| 2001/0030668 A1 | 10/2001 | Erten et al. | |
| 2004/0246229 A1 * | 12/2004 | Yamada | G06F 3/0317 345/156 |
| 2006/0007115 A1 * | 1/2006 | Furuhashi | G06F 3/0482 345/156 |
| 2007/0083819 A1 * | 4/2007 | Shoemaker | G06T 3/0018 715/767 |
| 2009/0168027 A1 * | 7/2009 | Dunn | G03B 21/26 353/28 |
| 2010/0214300 A1 * | 8/2010 | Alsbury | G06T 11/206 345/440.2 |
| 2014/0055355 A1 | 2/2014 | Song | |
| 2015/0029173 A1 * | 1/2015 | Nakata | G09G 5/18 345/213 |
| 2015/0049309 A1 * | 2/2015 | Sumiyoshi | G03B 21/26 353/31 |

* cited by examiner

*Primary Examiner* — Stacy Khoo

(74) *Attorney, Agent, or Firm* — Winston & Strawn LLP

(57) ABSTRACT

A system and method for highlighting a portion of a displayed presentation. The invention includes a first electronic device for generating a presentation for remote display; and a second electronic device for identifying a portion of the presentation for highlighting and for transmitting the identified portion of the presentation to the first electronic device. The first electronic device receives the transmitted identified portion of the presentation and generates an enhanced copy of the identified portion on the remote display as part of the presentation. The enhanced copy of the identified portion on the remote display is magnified, colored, outlined or otherwise converted to contrast with the remainder of the presentation.

20 Claims, 8 Drawing Sheets

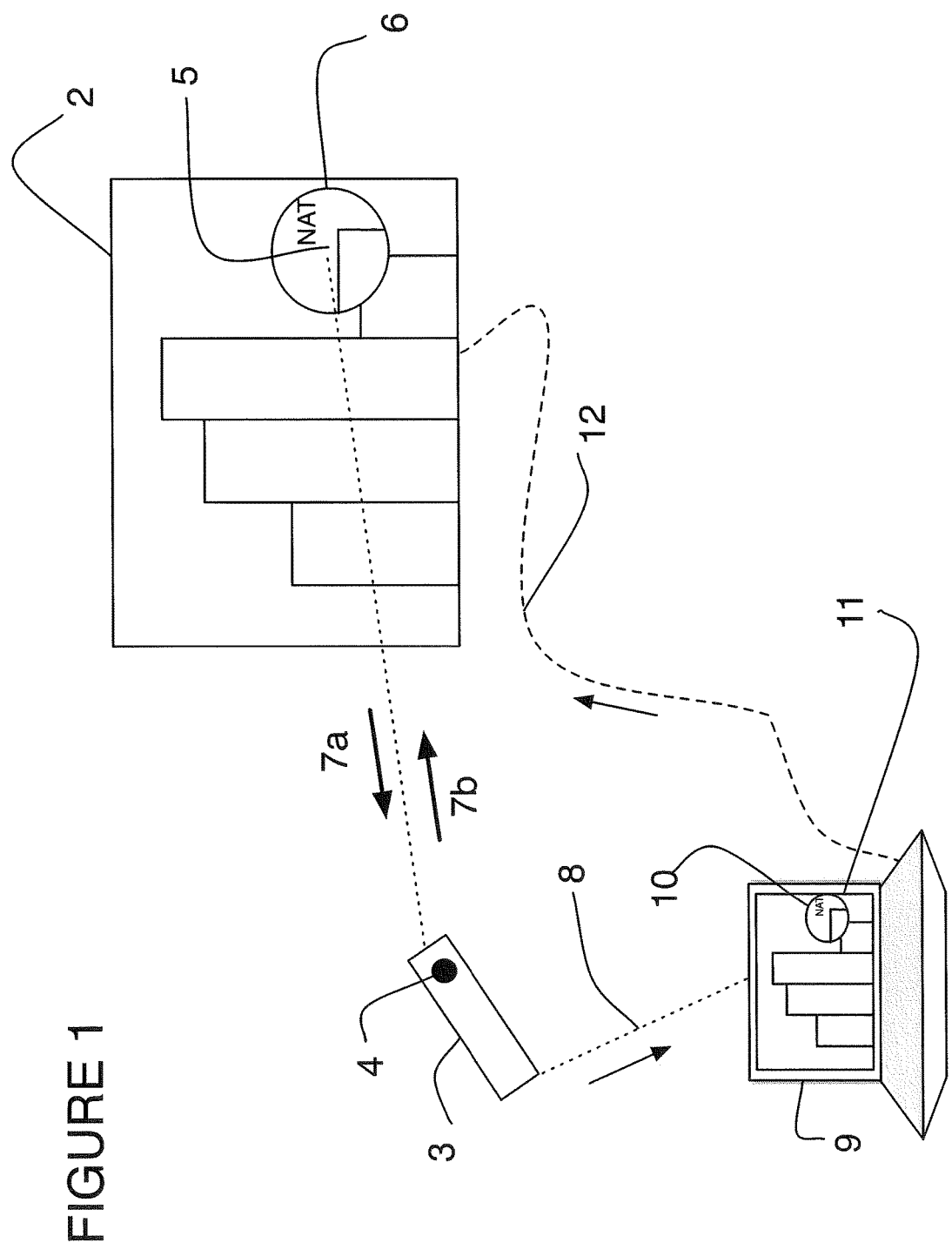

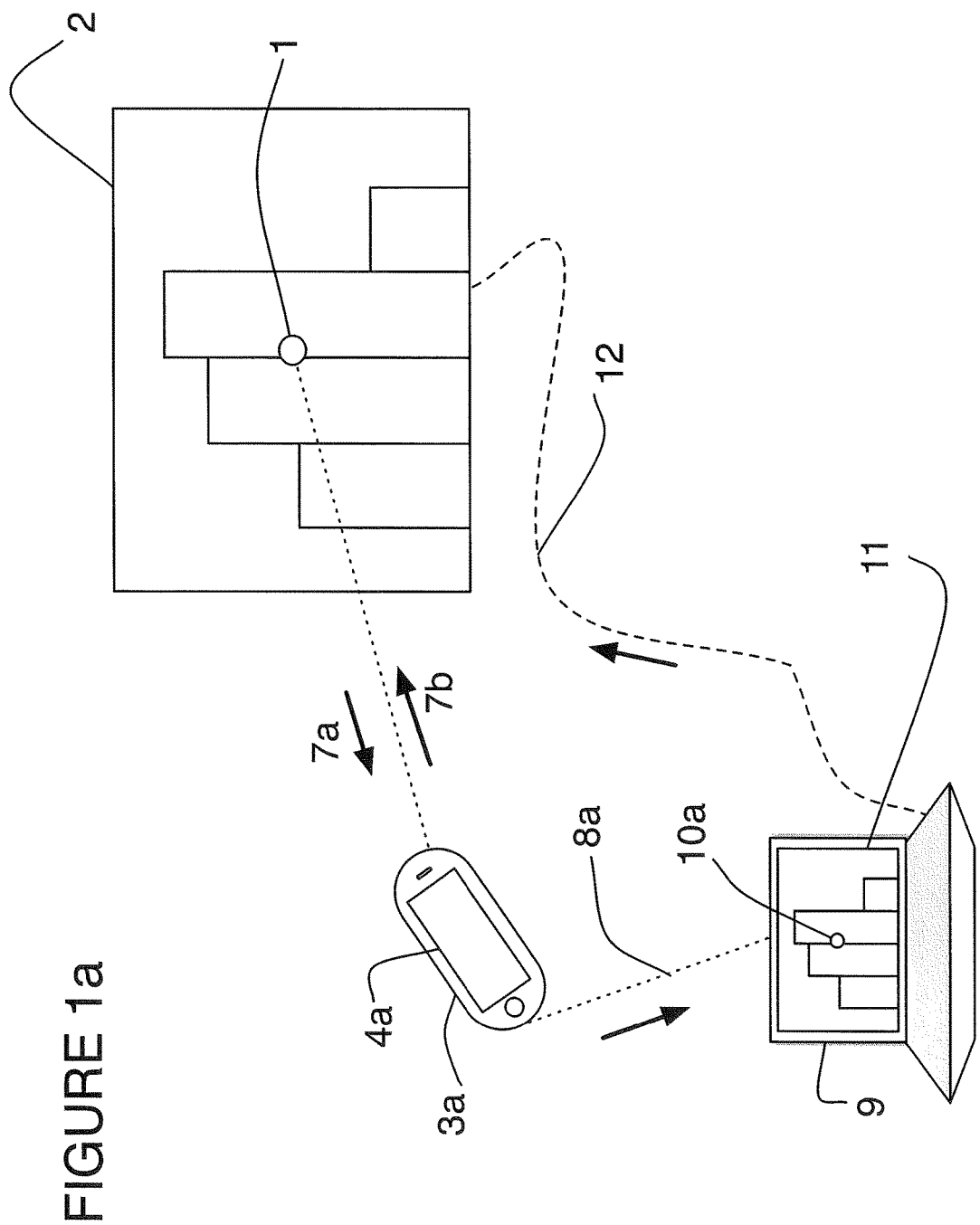

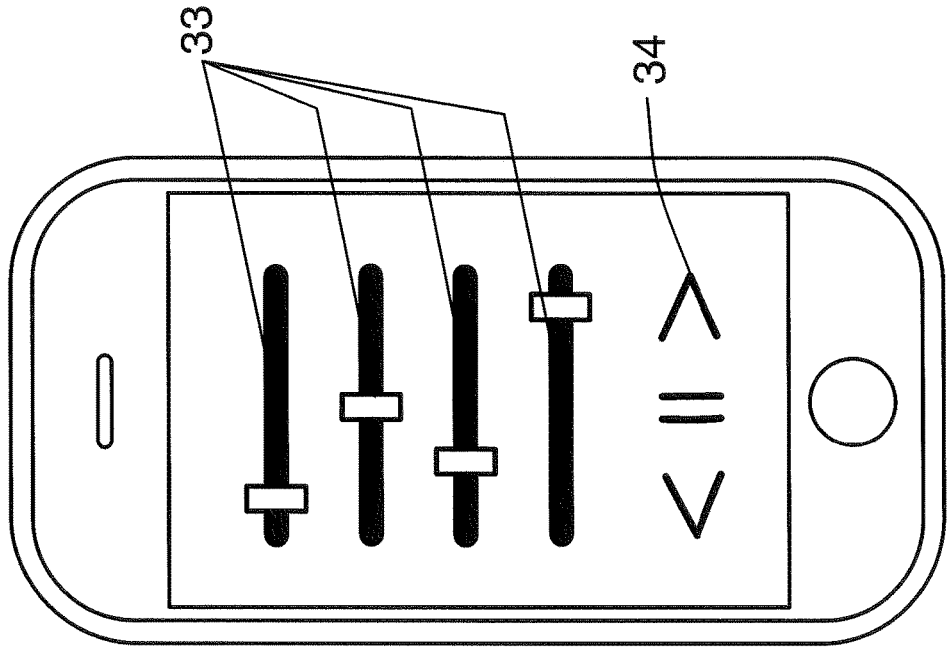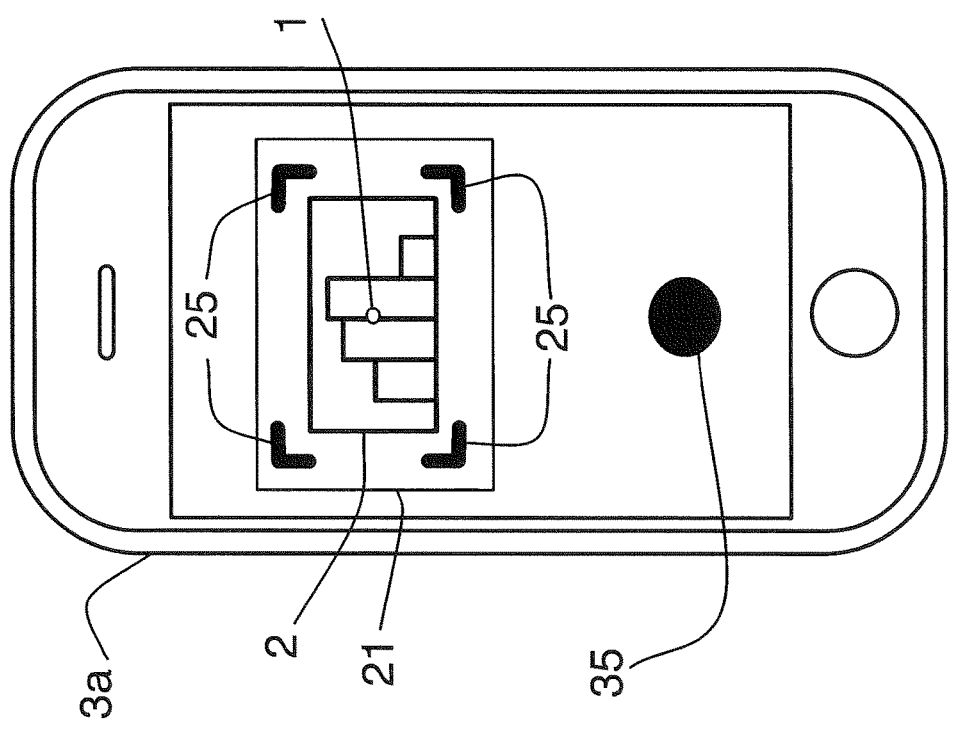

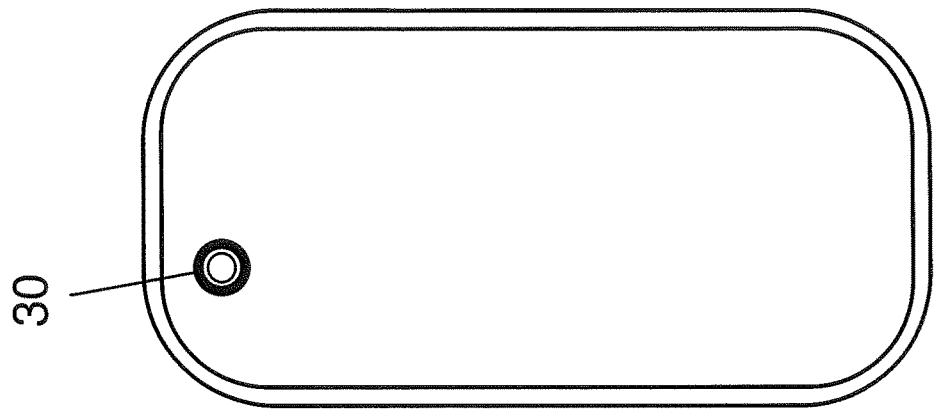
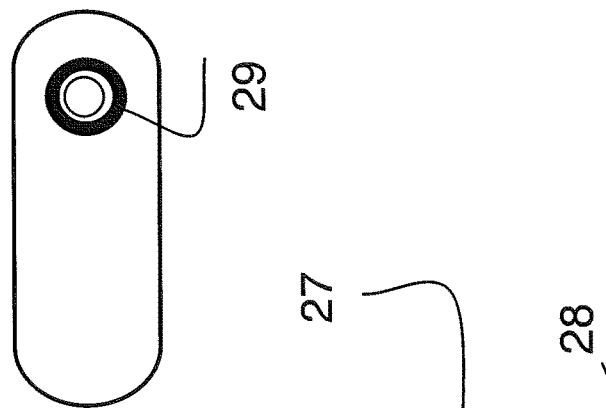
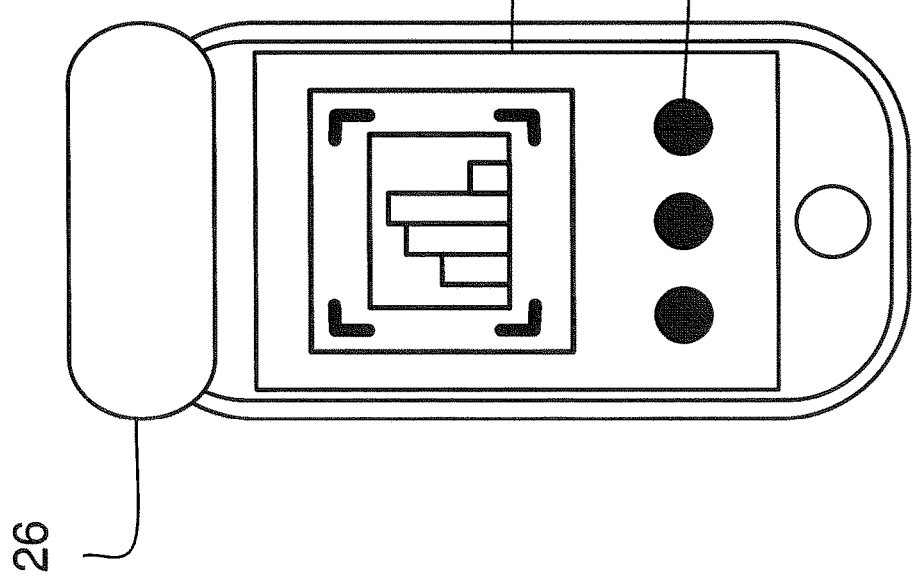

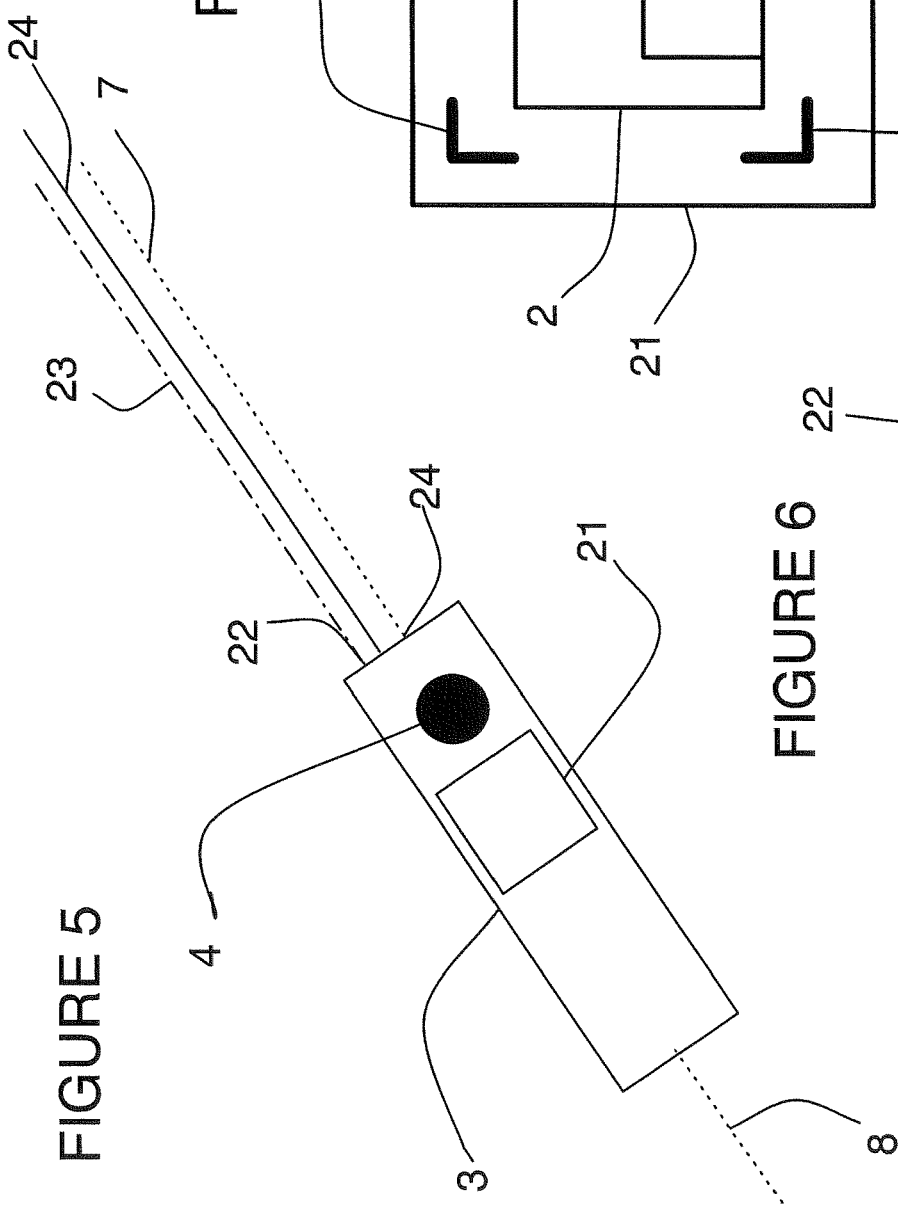

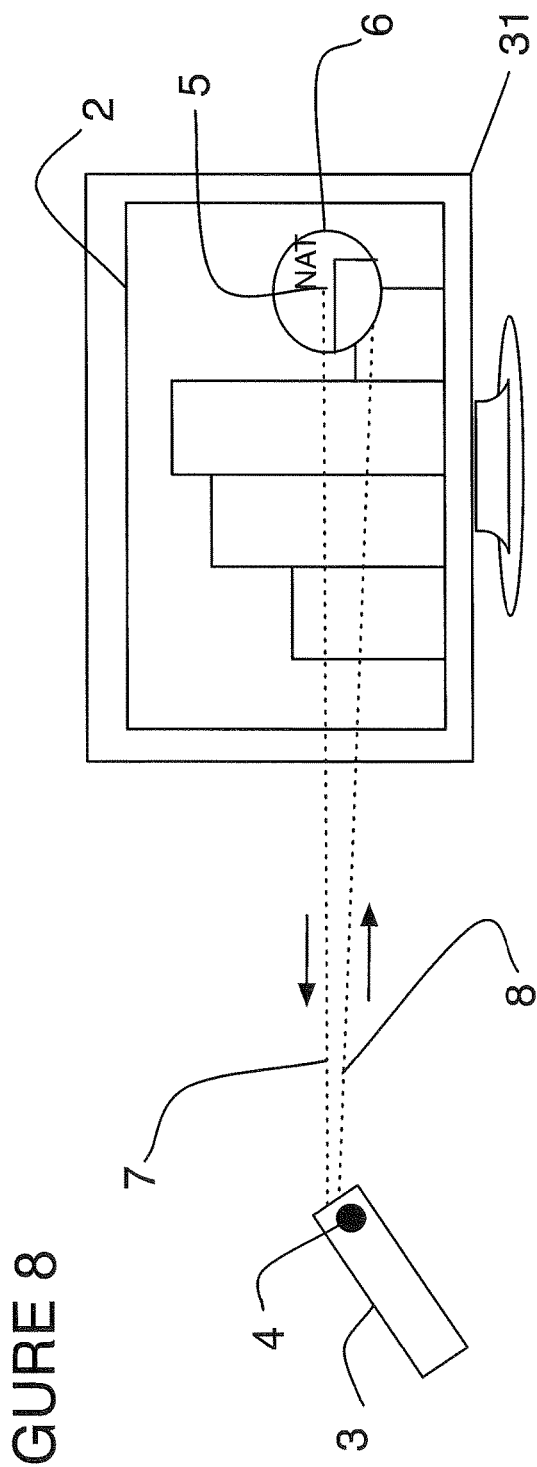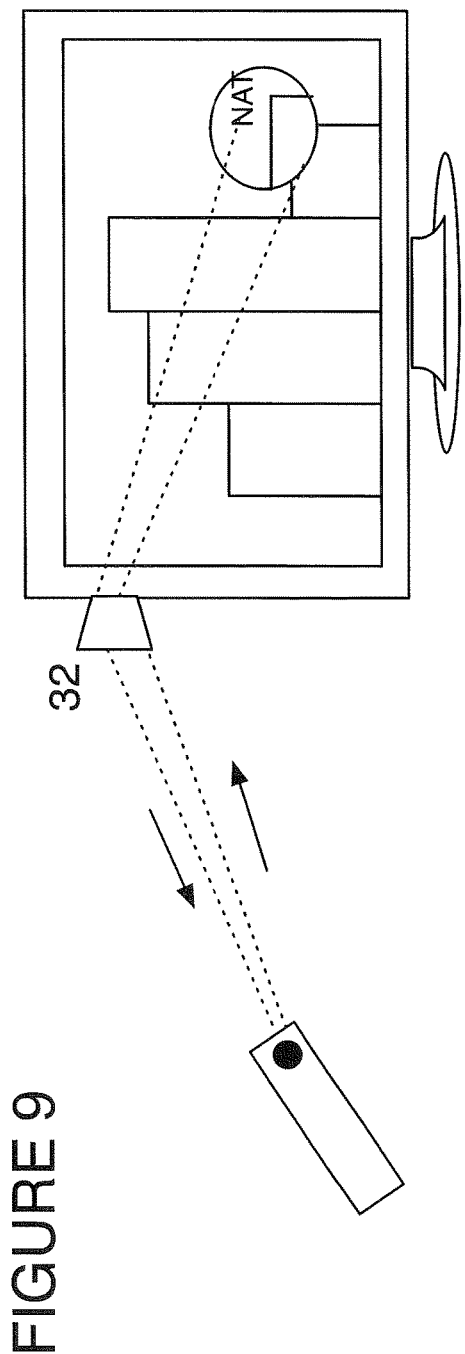

REMOTE CONTROL HIGHLIGHTER

CROSS-REFERENCE TO RELATED APPLICATIONS

This application claims the benefit of provisional application No. 62/041,221 filed Aug. 25, 2014, the entire content of which is expressly incorporated herein by reference thereto.

FIELD OF THE INVENTION

The invention relates to a device, system, and method of remotely highlighting and magnifying images and content on a projected or secondary screen.

BACKGROUND OF THE INVENTION

Educators and presenters customarily use handheld laser pointers to draw an audience's attention to a particular area on a presentation screen. These laser pointers or laser pens generally shoot a narrow beam of low-powered light to generate a small bright spot on the screen. The presenter can then remotely move the laser pointer to pinpoint, circle, or otherwise highlight something appearing on the screen. These low-powered lasers are generally created via infrared laser diodes and come in multiple colors, the most common being red, orange, green, blue, and violet.

There are a number of weaknesses with this method of highlighting material on the screen, namely it can be difficult for those observing the presentation in person or remotely to see or read the material being highlighted on the presentation screen. This is particularly challenging when it comes to reading small text, numbers, and details in drawings, pictures, and diagrams. Using a laser pointer on a television screen can also create glare and an inability to easily pinpoint something on the screen.

There is a need to create a simple device, system, and method to enable a presenter to highlight and magnify particular content wherever the material is projected.

SUMMARY OF THE INVENTION

The invention provides a system for highlighting a portion of a displayed presentation. This system includes a first electronic device for generating a presentation for remote display; and a second electronic device for identifying a portion of the presentation for highlighting and for transmitting the identified portion of the presentation to the first electronic device. The first electronic device receives the transmitted identified portion of the presentation and generates an enhanced copy of the identified portion on the remote display as part of the presentation.

Another embodiment of the invention is a method for highlighting a portion of a displayed presentation. The method comprises generating by a first electronic device a presentation for remote display; identifying a portion of the presentation for highlighting; and transmitting the identified portion of the presentation to the first electronic device. The first electronic device receives the transmitted identified portion of the presentation and generates an enhanced copy of the identified portion for presentation on the remote display.

For either embodiment, the enhanced copy of the identified portion on the remote display is magnified, colored, outlined or converted to contrast with the remainder of the presentation.

The first electronic device is advantageously a laptop computer, tablet or other mobile device, while the second electronic device is a pointer or mobile device, which may or may not include a laser pointer with a light beam. The pointer device may include a camera for providing video for identifying the portion of the presentation that is to be highlighted.

BRIEF DESCRIPTION OF THE DRAWINGS

FIGS. 1 and 1*a* are schematic views of the system of the invention, illustrating the interaction between the computer, pointer and presentation screen;

FIG. 1*b* is a detail view of how to calibrate the first electronic device using the second electronic device;

FIG. 1*c* is a detail view of how to adjust the enhanced copy of the identified portion on the remote display using the second electronic device;

FIG. 1*d* illustrates a hardware attachment for a mobile device;

FIG. 1*e* shows the camera of the hardware attachment of FIG. 1*d*;

FIG. 1*f* illustrates the camera of a mobile telephone;

FIG. 5 is an illustration of a pointer device that includes a camera;

FIG. 6 is a front view of the pointer device to show the camera and laser;

FIG. 7 is a detail view of the embedded screen of the pointer device; and

FIGS. 8 and 9 illustrate the use of the system with a monitor or television.

DETAILED DESCRIPTION OF THE INVENTION

The present invention relates to a device, system, and method of remotely highlighting and magnifying subject matter on a projected or secondary screen. The preferred embodiment includes a remote control with a pointer capable of magnifying the material highlighted on the presentation screen or screens.

Figure 1G:
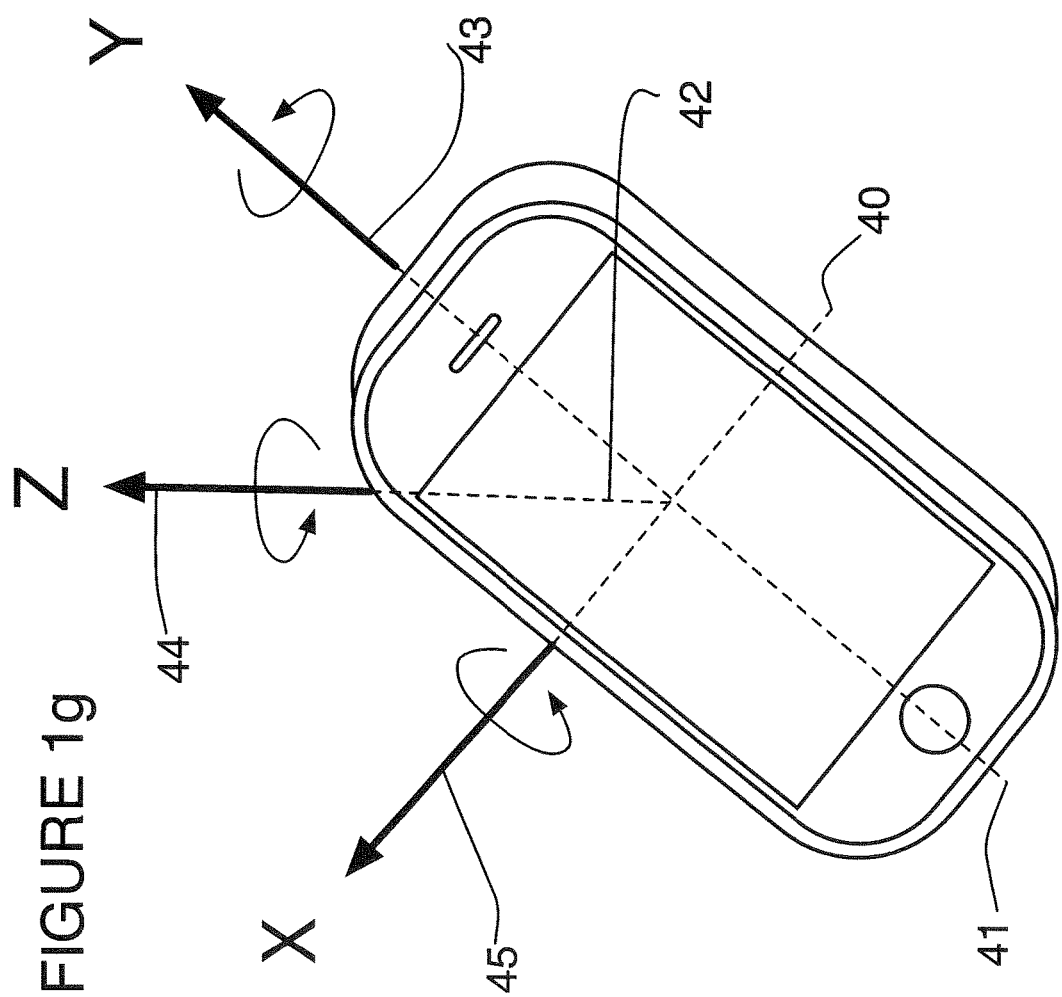
FIG. 1*g* shows orientation of the second device relative to presentation screen.
Figure 1G:
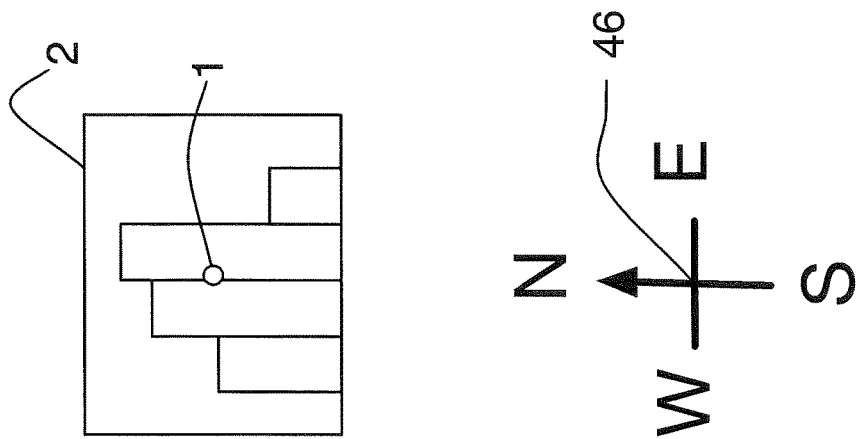

In the preferred embodiment, shown in FIG. 1, the first electronic device is a "primary device" (9) such as a computer or mobile device containing a "presentation" (11). The presentation (11) is attached to, sent to, or mirrors the presentation from the primary device on a "presentation screen" (2). The second electronic device is a handheld remote-controlled pointer or "pointer" (3) is then used to pinpoint a location ("pinpoint location") (5) on the presentation screen. This is shown on FIG. 1*b*. The pointer (3) can be programmed to generate an enlargement circle or shape of a predetermined radius R to identify the portion of the presentation that needs to be highlighted. The user can then trigger or lock onto the pinpoint location. The pointer then wirelessly sends the "location data" (7), (8) about the pinpoint location back to the primary device that in turn determines the location that is to be enhanced and projects back the enhanced location so that it can be more easily viewed on the presentation. As noted herein, the enhancement can be an increase in size, a change or contrast in color, a change of font (e.g., bolding) an outline of the particular location or the like. This is achieved only in the location that is determined by the location data and is part but not all of the presentation. In the simplest form of the invention, the area can simply be provided with a different color. Typically, the location would be magnified ("magnified area") (6) on the presentation screen so it becomes more visible to viewers.

The magnified area can appear in any predetermined size, shape, and level of magnification, and can take over the entire presentation screen ("full screen") or provide an exploded view with the rest of the presentation in the background akin to a magnifying glass, fisheye lens, or flashlight effect (6).

In a preferred embodiment, the pointer would include means for reading the pinpoint location generated by pointing the second electronic device (3a) as depicted in FIG. 1a to determine the approximate center (1) of the presentation screen and capturing the orientation of the second electronic device relative to presentation screen. "Orientation data" would be ascertained as depicted in FIG. 1g by measuring the x-axis (45), y-axis (43), and z-axis (44) of the second electronic device—essentially the pitch, roll, yaw or beta, gamma, alpha of a mobile device—paired with the compass bearing (46) of the secondary device relative to the center of the presentation screen (1).

The center of the screen can be generally ascertained by the human eye or via an infrared laser light beam commonly found in a laser point. In another embodiment, a camera (30) and display (21) core to the secondary device (3a) is used to pinpoint with greater precision the four corners (25) and center (1) of the presentation screen (2).

Figure 4:
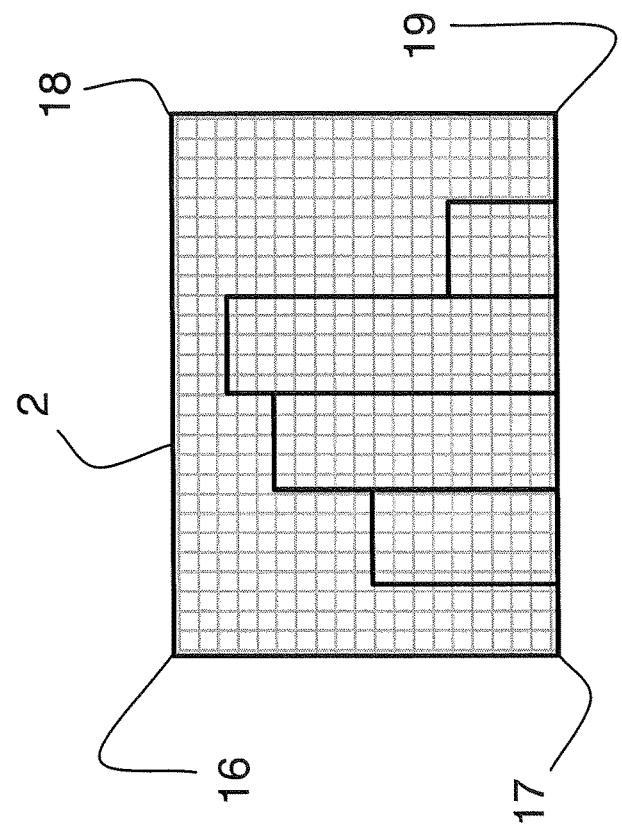
FIG. 4 shows the grid coordinates of a portion of the presentation.
Figure 2:
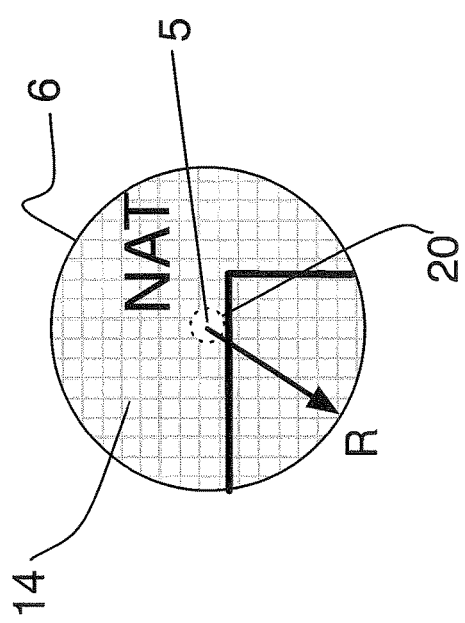
FIGS. 2 and 3 illustrate the magnified portion of the presentation.
Figure 3:
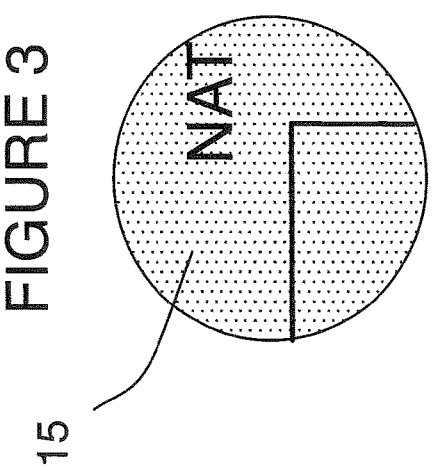

Alternatively, the camera (29) can be a part of an attachment (26) to a mobile device (3a) or the like. In another embodiment, the reading the location of the laser pointer could be accomplished by reading grid lines or coordinates or dots that were not visible to the eye but were embedded in the background of the presentation and are readable by the pointer as depicted in FIGS. 2, 3, and 4. The pinpoint location can also be determined as disclosed in U.S. Pat. No. 6,275,214 or 8,436,836 or US patent publications 2001/0030668A1 or 2014/0055355A1, each of which is expressly incorporated herein by reference thereto.

In addition, the pointer can be calibrated to the presentation so that movement of the pointer along a particular path defines the orientation, rotation, acceleration or coordinates of the area that is to be enhanced and this information is sent to the primary device. Alternatively, the pointer can be calibrated to internally read the orientation, rotation, acceleration, or coordinates and forward them back to the primary device or computer which could process the data to enhance the same area of the presentation on the primary device (i.e., PowerPoint or Keynote). The primary device would also have an added feature, service, macro, option, or add-on software that could translate this orientation, rotation, acceleration or coordinates into an enhancement. In either situation, the primary device sends the enhanced presentation back to the presentation screen or secondary device.

The primary or secondary device can be used to adjust the size, shape, level of magnification, and tracking speed of the magnification or augmentation. The primary or secondary device or pointer can include physical or virtual buttons, switches, dials, or sliding levers on it in the same manner as a remote control device for a television. Alternatively, there would be ways in the presentation program on the primary or secondary device that enables the user to set the enhancement feature, e.g., the default size, shape, location, as well as the magnification, color, or the like as depicted in 1c. The secondary device could also include the customary features available with remote presentation devices including the ability to control and advance slides or builds in a presentation (34).

In the preferred embodiment, once the presenter locks the pointer onto a pinpoint location, the controller has the option to remain on that singular location or have the pointer and primary device continue to track the movement of the pointer and corresponding coordinates of the pinpoint location—the result being a magnified or exploded view fluidly and continually traveling across the background of the presentation synchronously with the movement of the pointer. As noted herein, once the coordinates are determined, the data is sent back to the primary device, essentially creating a "flashlight effect." Alternatively, a camera or lens in the pointer or mobile device can be used to set the perimeter of the presentation and from that the pointer can interpret the orientation or locations pointed at on the presentation, and send that data from the pointer to the primary device for enhancement of the pinpoint location and return of the enhanced area back to the presentation or secondary device. The orientation data can correspond to specific quadrants, grid locations, X, Y, and Z coordinates, compass bearings, X, Y, and Z acceleration, movement, or rotation, or any other number of data points (14), (15). The location data can be ascertained in a number of ways.

In a preferred embodiment, the "orientation data" is combined with "movement data" from one pinpoint location to another. Movement data is ascertained based on the three-dimension rotation and acceleration of the secondary device relative to the presentation screen as depicted in FIG. 1g. "Movement data" and "orientation data" is often secured via gyroscope, accelerometer or magnetometer sensors or a chip or chips within a mobile or wireless device that captures inertial measurement units (IMUs) commonly that represent degrees of freedom (DOFs).

In another embodiment, a layer is added to the presentation itself that includes microdots or grid locations or other identifying information (14), (15) invisible to the human eye but is readable by the pointer. FIG. 2 shows the location data in the form of a grid, while FIG. 3 shows the data in the form of microdots. The presenter can use the pointer to ascertain the precise pinpoint location either by projecting a bright spot (20) on the presentation screen as a guide or by triggering the magnified area (5), (6), for example, by pressing a button (4) that engages the magnification. Another button can set the radius R so that a larger portion of the presentation is magnified.

In another embodiment, as shown in FIG. 4, ascertaining the location data does not require adding a layer to the presentation itself and instead the pointer can be used to set the perimeter of the presentation screen ("presentation perimeter") (2). In this case, the pointer is used to establish the coordinates of the presentation perimeter by interpreting or interpolating where the pointer is pointed. The user can establish the presentation perimeter using the pointer to set or identify the corners (16), (17), (18), (19) or alternatively by drawing around the entire perimeter of the presentation. The presentation perimeter information is then passed from the pointer (7) to the primary device (8), in order to reconcile the pinpoint location on the presentation screen with the pinpoint location on the primary screen.

A preferred way to do this is to provide a small screen inside the pointer, or on a similar remote control device, or even on an iPhone or other mobile device. Alternatively, the location could be accomplished by the software in the primary device as depicted in FIG. 4. These would be used to essentially frame up the secondary presentation screen—similar to what occurs when reading a QR code—and then use that perimeter to establish detailed x/y coordinates that could be correlated to the presentation on the primary device via the remote. It may also be helpful to include an accelerometer or gyroscope in the pointer or remote device to understand how it is positioned relative to the presentation screen. When the remote device is synced to the secondary screen in this way, the location coordinates can be passed from the secondary device to the primary device back to the secondary device, as often as necessary during the presentation.

In another embodiment illustrated in FIG. 5, the pointer includes a camera (22), with a front view of the pointer shown in FIG. 6. The pinpoint location can be set either by a laser lens and beam (24) combined with a camera lens (22) as shown in FIGS. 5 and 6, or by the camera lens, laser lens, and/or display screen. This establishes the perimeter via the QR-code reading on the display screen, which interprets the pinpoint location. The pointer (3) includes a corresponding embedded screen (21) with on-screen guides or brackets (25) to view the presentation screen and set the presentation perimeter that is transmitted (7) back to the pointer and then transmitted (8) to the primary device. Further details of the embedded screen (21) are shown in FIG. 7. Alternatively the primary device is used to set the presentation perimeter via the pointer's camera (22).

In a preferred embodiment, the pointer device—with or without a camera and/or screen—is an integral part of the same remote control that is used to paginate through a presentation. Alternatively, the pointer device can be a hardware attachment to an existing mobile device like an iPhone, iPad, Android, or Windows handset where the mobile device either serves as the primary device or communicates with a primary device. The mobile device can include a program, application, or app ("software") to enable the user to adjust the size, shape, and magnification of the magnified area.

In another embodiment, the camera portion of the pointer, camera portion of the attachment to the mobile device, or the camera portion of the mobile device itself can be used to view the presentation screen and software and hardware enables the user to use controls or a touchscreen to both set the presentation perimeter as well as identify the pinpoint location to in turn generate the magnified area on the presentation screen. Said another way, the presenter can point the device with the camera at the presentation screen, set or lock the presentation perimeter, and then proceed to touch or pinpoint locations within the presentation perimeter in turn magnifying the area on the presentation screen. The presenter could also run his or her finger over the touchscreen on the pointer or mobile device to highlight different portions of the presentation on the presentation screen.

In yet another embodiment, the pointer, attachment to the mobile device, or camera itself can also capture the physical three-dimensional location of the presentation screen in combination with an internal accelerometer or gyroscope or the like to enable the user to then position or aim the pointer, mobile device, or mobile device and attachment in the direction of the presentation screen to set the pinpoint location.

In another embodiment as shown in FIG. 8, the presentation screen can be a monitor or television (31) that includes hardware and/or software that is integral to the monitor or television to communicate with the pointer to highlight the programming or content on the screen as described above. Alternatively, shown in FIG. 9, the presentation screen can be a component (32) that includes hardware and/or software and that is attached to the television or monitor (32) to communicate with the pointer to enhance or magnify the programming or content on the screen.

What is claimed is:

1. A system for highlighting a portion of a displayed presentation which comprises:
    a first electronic device for generating a presentation; and
    a second electronic device for pinpointing a location on the presentation that represents the center point of a portion of the presentation to be emphasized or highlighted, for determining location of the pinpoint location on the presentation and generating location data corresponding to the determined location on the presentation, and for transmitting the location data to the first electronic device, and the second electronic device further tracks the x-axis, y-axis, and z-axis orientation of the second device relative to that pinpoint location on the presentation, continually communicating the coordinates of that orientation to the first electronic device;
    wherein the first electronic device receives the location data, establishes a portion of the presentation to be enlarged or magnified using the location data as its center point, and generates an enlarged, highlighted or magnified copy of that portion upon and as part of the presentation while a remaining part of the presentation remains in place unchanged.

2. The system of claim 1, wherein the first electronic device magnifies the portion of the presentation akin to a magnifying glass or fisheye lens to provide emphasis and contrast with the remaining part of the presentation.

3. The system of claim 1, wherein the first electronic device is a laptop computer, tablet, smart phone or other mobile device.

4. The system of claim 1, wherein the second electronic device is a smart phone or other mobile device or a laser pointer.

5. The system of claim 1, wherein the second electronic device generates an enlargement circle or shape of a predetermined size to identify the portion of the presentation that needs to be enlarged, highlighted or magnified.

6. The system of claim 5, wherein the enlarged or magnified copy of the identified portion is a circle surrounding the enlarged or magnified portion of the presentation.

7. The system of claim 6, wherein the enlarged, highlighted or magnified copy of the portion of the presentation is also colored to provide further contrast with the remainder of the presentation.

8. The system of claim 1, wherein the enlarged, highlighted or magnified copy of the portion of the presentation is also colored to provide further contrast with the remainder of the presentation.

9. A method for highlighting a portion of a displayed presentation which comprises:
    generating by a first electronic device a presentation;
    pinpointing by a second electronic device a location on the presentation that represents a center point of a portion of the presentation to be emphasized or highlighted;
    determining location of the pinpoint location on the presentation by the second electronic device and generating location data corresponding to the determined location on the presentation by the second electronic device;
    transmitting the location data from the second electronic device to the first electronic device;

tracking by the second device the x-axis, y-axis, and z-axis orientation of the second electronic device relative to that pinpoint location on the presentation;

continually communicating the coordinates of the orientation from the second electronic device to the first electronic device;

receiving by the first electronic device the location data;

establishing by the first electronic device a portion of the presentation to be enlarged or magnified using the location data as its center point; and generating by the first electronic device an enlarged, highlighted or magnified copy of that portion upon and as part of the presentation while a remaining part of the presentation remains in place unchanged.

10. The method of claim 9, wherein the first electronic device magnifies the portion of the presentation akin to a magnifying glass or fisheye lens to provide emphasis and contrast with the remaining part of the presentation.

11. The method of claim 9, wherein the first electronic device is a laptop computer, tablet, smart phone or other mobile device.

12. The method of claim 9, wherein the second electronic device is a smart phone or other mobile device or a laser pointer.

13. The method of claim 9, wherein the second electronic device generates an enlargement circle or shape of a predetermined size to identify the portion of the presentation that needs to be enlarged, highlighted or magnified.

14. The method of claim 13, wherein the enlarged or magnified copy of the identified portion is a circle surrounding the enlarged or magnified portion of the presentation.

15. The method of claim 14, wherein the enlarged, highlighted or magnified copy of the portion of the presentation is also colored to provide further contrast with the remainder of the presentation.

16. The method of claim 9, wherein the enlarged, highlighted or magnified copy of the portion of the presentation is also colored to provide further contrast with the remainder of the presentation.

17. A system for highlighting a portion of a displayed presentation which comprises:

a first electronic device for generating a presentation, wherein the first electronic device is a laptop computer, tablet or mobile device; and a second electronic device for pinpointing a location on the presentation that represents the center point of a portion of the presentation to be emphasized or highlighted, for determining location of the pinpoint location on the presentation and generating location data corresponding to the determined location on the presentation, and for transmitting the location data to the first electronic device, wherein the second electronic device is a smart phone or other mobile device or a laser pointer and further tracks the x-axis, y-axis, and z-axis orientation of the second device relative to that pinpoint location on the presentation, continually communicating the coordinates of that orientation to the first electronic device;

wherein the first electronic device receives the location data, establishes a portion of the presentation to be enlarged or magnified using the location data as its center point, and generates an enlarged, highlighted or magnified copy of that portion in an enlargement circle having radius R upon and as part of the presentation while a remaining part of the presentation remains in place unchanged, wherein the first electronic device magnifies the portion of the presentation akin to a magnifying glass or fisheye lens to provide emphasis and contrast with the remaining part of the presentation.

18. The system of claim 17, wherein the enlarged, highlighted or magnified copy of the portion of the presentation is also colored to provide further contrast with the remainder of the presentation.

19. A method for highlighting a portion of a displayed presentation which comprises:

generating by a first electronic device a presentation, wherein the first electronic device is a laptop computer, tablet, smart phone or other mobile device;

pinpointing by a second electronic device a location on the presentation that represents a center point of a portion of the presentation to be emphasized or highlighted, wherein the second electronic device is a smart phone or other mobile device or a laser pointer;

determining location of the pinpoint location on the presentation by the second electronic device and generating location data corresponding to the determined location on the presentation by the second electronic device;

transmitting the location data from the second electronic device to the first electronic device;

tracking by the second device the x-axis, y-axis, and z-axis orientation of the second electronic device relative to that pinpoint location on the presentation;

continually communicating the coordinates of the orientation from the second electronic device to the first electronic device;

receiving by the first electronic device the location data;

establishing by the first electronic device a portion of the presentation to be enlarged or magnified using the location data as its center point; and generating by the first electronic device an enlarged, highlighted or magnified copy of that portion in an enlargement circle upon and as part of the presentation while a remaining part of the presentation remains in place unchanged, wherein the first electronic device magnifies the portion of the presentation akin to a magnifying glass or fisheye lens to provide emphasis and contrast with the remaining part of the presentation.

20. The method of claim 19, wherein the enlarged, highlighted or magnified copy of the portion of the presentation is also colored to provide further contrast with the remainder of the presentation.

* * * * *